Nov. 6, 1923.

H. FOLEY

CALCULATING DEVICE

Filed Sept. 30, 1921

1,473,573

INVENTOR
BY Hugh Foley
ATTORNEY

Patented Nov. 6, 1923.

1,473,573

UNITED STATES PATENT OFFICE.

HUGH FOLEY, OF SOURLAKE, TEXAS.

CALCULATING DEVICE.

Application filed September 30, 1921. Serial No. 504,389.

*To all whom it may concern:*

Be it known that I, HUGH FOLEY, a citizen of the United States, residing in Sourlake, county of Hardin, and State of Texas, have invented certain new and useful Improvements in Calculating Devices, of which the following is a specification.

This invention relates broadly and generally to calculating devices and has particular reference to a device for rapidly computing differences in linear measurement and the corresponding volumes in gaging tanks or other receptacles wherein the liquid level is rising or falling.

The device of my invention includes a pair of dials upon one of which is placed a scale arranged in duplicate in each half arc of the circle with the units extending from the lower to the higher units in the same direction in each arc. The other dial is rotatably and concentrically mounted upon the first and is equipped with one or more scales with the units extending from the lower to the higher in the same direction as on the first dial. A rotatable disc is positioned over the second dial and is provided with openings adapted to expose figures on the scales of the second dial. The second dial and covering disc are provided with pointers which play on the scale of the first dial. Adjustable means may be provided for covering and uncovering the openings on the covering disc so that the particular opening desired at any given time may be used.

In the accompanying drawings I have illustrated a preferred form of the invention in which.

Figure 1:
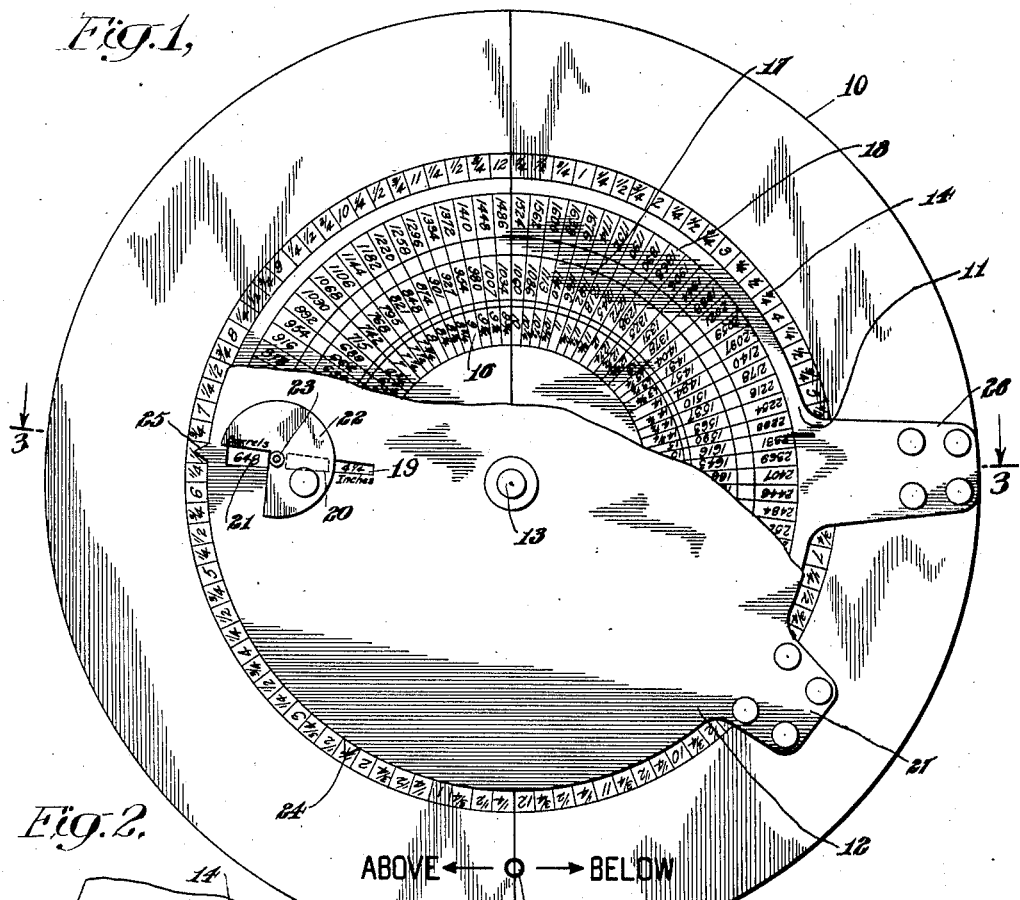
Figure 1 is a plan view partially broken away of an apparatus constructed in accordance with the invention and constituting an embodiment thereof.

Referring to the drawings it will be seen that the apparatus illustrated comprise a disc 10 upon which concentric discs 11 and 12 are rotatably mounted on a pin 13. The disc 10 is of larger diameter than discs 11 and 12 which are preferably of substantially the same diameter, the disc 12 being arranged to cover the disc 11.

The disc or dial 10 is provided with a circular scale 14 graduated in inches and fractions thereof or in other suitable units of measure as may be desired. In the form of apparatus illustrated it will be noted that the dial 10 is provided with a zero point at 15 and that the scale 14 is graduated in quarter inches from ¼ inch to 12 inches, the graduations extending from the lower to the higher units in the same direction in each arc.

The dial 11 is provided with a scale 16 graduated in any convenient units of measurement covering such variations in liquid levels as may be desired. The apparatus illustrated is designed particularly for tanks or receptacles containing oil, water or other liquids and the scale 16 is graduated in units adapted to include the ordinary differences in gages encountered. It will be seen that this scale is calibrated in quarter inches from ¼ inch to 24 inches arranged in a clockwise direction on the dial 11. The particular apparatus illustrated is designed for use on the standard 55,000 barrel and 37,500 barrel tanks which are commonly employed in the petroleum industry and the dial 11 is equipped with scales 17 and 18 which indicate the number of barrels corresponding to the differences in inches shown on scale 16, the scale 17 showing differences in barrels for a 37,500 barrel tank and scale 18 showing the differences in barrels for a 55,000 barrel tank. It will be observed that the several scales on the disc 11 are arranged in concentric circular formation.

Figure 2:
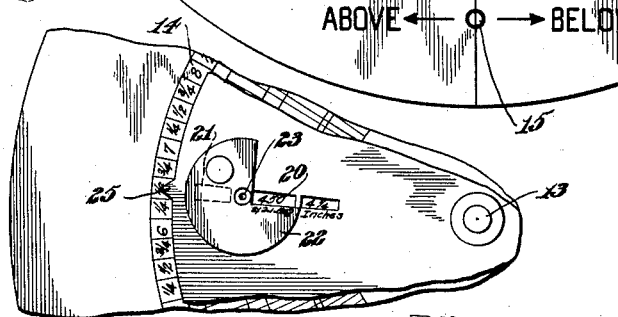
Figure 2 is a fragmentary plan view.
Figure 3:
Figure 3 is a section taken on the line 3—3 of Figure 1.

The disc 12 is provided with openings through which the figures on the several scales on dial 11 may be seen, opening 19 being for scale 16, opening 20 for scale 17 and opening 21 for scale 18. A circular member 22 having a portion cut away is mounted upon the dial 12 and arranged to be rotated upon a pin 23. By rotating the member 22 upon its axis 23 either one of the openings 20 or 21 may be exposed to view. In Figure 1 of the member 22 is shown so positioned as to expose the opening 22 for the gage 18 and in Figure 2 the member 22 is so arranged that the opening 20 is presented to view. The discs 11 and 12 are provided with pointers 24 and 25, respectively, which are adapted to play upon the scale 14 of the dial 10. The dials 11 and 12 are preferably equipped with handles 26 and 27.

In operation whether the liquid level be rising or falling the pointer 24 of the dial 11 is moved on the scale 14 to the lower gage and the pointer 25 of the dial 12 is moved to the higher gage. When the difference in the gage involves a difference in inches only care should be taken that both pointers 24 and 25 are in the same arc, "Above" or "Below" the zero point 15. Let us suppose that a former gage showed 9 feet 2¼ inches and a subsequent gage indicated 9 feet 6½ inches. In order to compute the difference in inches and the corresponding difference in barrels, the pointer of dial 11 is set at the lowest gage, that is, at 2¼ inches, the pointer 24 being removed in either the arc "above" or the arc "below" the zero point 15. The pointer 25 of the dial 12 is moved to the other gage, 6½ inches. The difference in inches as seen through the opening 19 on the scale 16 is found to be 4¼ inches. The difference in barrels for a 55,000 barrel tank, as shown through the opening 21 on the scale 18, is found to be 648 barrels and the difference in barrels for a 37,500 barrel tank, as shown through the opening 20 in the scale 17, is found to be 450 barrels.

In order to show the use of the zero point 15, it may be supposed that a former gage was 8 feet 3¼ inches and a subsequent gage 7 feet 10½ inches. In order to compute the difference in inches and barrels, the pointer 24 of the dial 11 is moved on the scale 14 to 10½ inches in the arc "below" the zero point and the pointer 25 of the dial 12 is moved on the scale 14 to 3¼ inches in the arc "above" the zero point. It is found that the difference in inches, as seen through the opening 19 on the scale 16, is 4¼ inches, the difference in barrels for a 37,500 barrel tank, as shown through the opening 20 on the scale 17, is 504 barrels and the difference in barrels for a 55,000 barrel tank, as seen through the opening 21 on the gage 18, is 725 barrels.

Apparatus of preferred form and construction has been illustrated and described for the purpose of showing a way in which this invention may be used, but the inventive thought upon which this application is based, is broader than this illustrative embodiment thereof, and I therefore intend no limitations other than those imposed by the appended claim.

What I claim is:—

In a device of the character described, a dial having a circular scale, a pair of discs rotatably and concentrically mounted on said dial, said discs being of substantially the same diameter and of less diameter than said dial and one of said discs being arranged to substantially cover the other, a plurality of scales arranged in concentric circular formation on the covered disc, a plurality of openings on the covering disc arranged at distances from the center thereof to correspond to the positions of the several scales on the covered disc, a member rotatably mounted on the covering disc and adapted upon rotation to expose severally the openings in said covering disc and pointers upon said covered and covering discs adapted to play upon the scale of said dial.

In witness whereof I have hereunto set my hand and seal this 16th day of Sept. 1921.

HUGH FOLEY.